(12) United States Patent
Mitchell

(10) Patent No.: US 9,885,606 B1
(45) Date of Patent: Feb. 6, 2018

(54) COMPACT SPECTROMETER WITH HIGH SPECTRAL RESOLUTION

(71) Applicant: Thomas A. Mitchell, Nazareth, PA (US)

(72) Inventor: Thomas A. Mitchell, Nazareth, PA (US)

(73) Assignee: WAVEFRONT RESEARCH, INC., Bethlehem, PA (US)

(*) Notice: Subject to any disclaimer, the term of this patent is extended or adjusted under 35 U.S.C. 154(b) by 80 days.

(21) Appl. No.: 14/212,327

(22) Filed: Mar. 14, 2014

Related U.S. Application Data

(60) Provisional application No. 61/782,546, filed on Mar. 14, 2013.

(51) Int. Cl.
*G01J 3/28* (2006.01)
*G01J 3/02* (2006.01)

(52) U.S. Cl.
CPC .......... *G01J 3/2823* (2013.01); *G01J 3/0208* (2013.01)

(58) Field of Classification Search
CPC .......... G01J 3/2823; G01J 3/18; G01J 3/0256; G01J 3/0208
See application file for complete search history.

(56) References Cited

U.S. PATENT DOCUMENTS

| | | | | |
|---|---|---|---|---|
| 6,690,467 B1* | 2/2004 | Reel | ........................ | G01J 3/02 356/328 |
| 2004/0070853 A1* | 4/2004 | Ebizuka | ................... | G01J 3/12 359/833 |
| 2004/0156048 A1* | 8/2004 | Mitchell | ................... | G01J 3/02 356/305 |
| 2004/0227940 A1* | 11/2004 | Mitchell | ................... | G01J 3/18 356/328 |
| 2012/0105845 A1* | 5/2012 | Herrala | ................. | G01J 3/0208 356/326 |

* cited by examiner

*Primary Examiner* — Michael A Lyons
*Assistant Examiner* — Maurice Smith
(74) *Attorney, Agent, or Firm* — Burns & Levinson LLP; Orlando Lopez

(57) ABSTRACT

A spectrometer having slit and detector elements located on the optical axis of the spectrometer, resulting in substantially increased spectral and spatial fields of the spectrometer. The spectrometer being more compact than current designs, while providing superior spatial and spectral image quality and resolution.

14 Claims, 7 Drawing Sheets

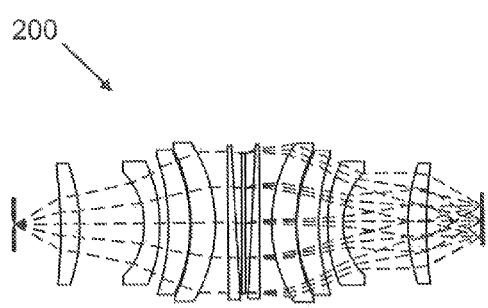
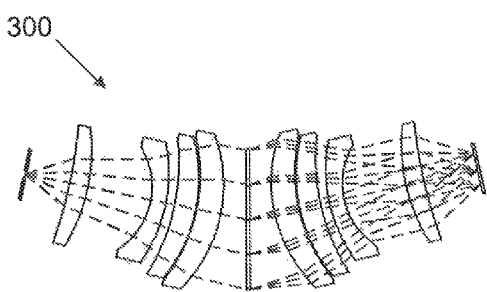
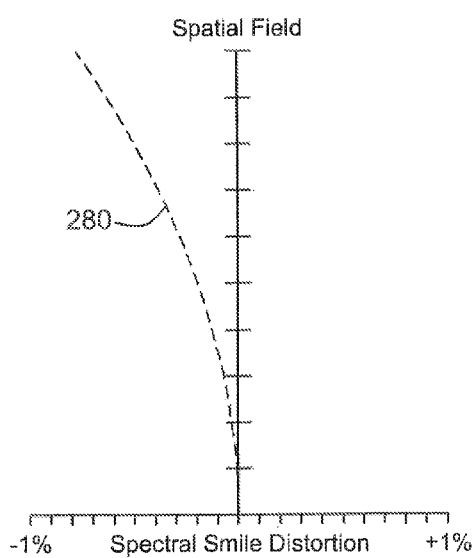
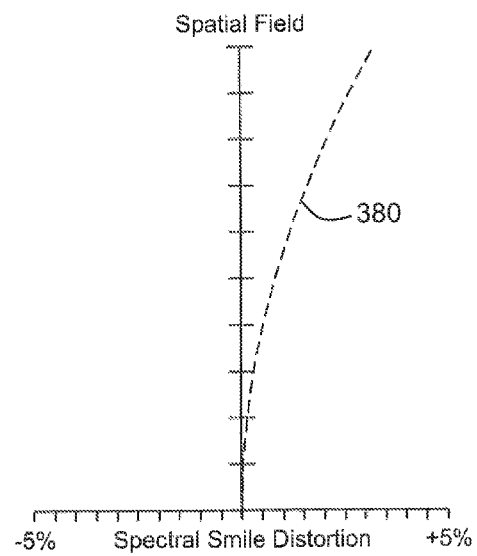
Figure 6A                                  Figure 6B

COMPACT SPECTROMETER WITH HIGH SPECTRAL RESOLUTION

CROSS-REFERENCE TO RELATED APPLICATIONS

This application claims priority to U.S. Provisional Application No. 61/782,546, filed on Mar. 14, 2013, which is incorporated by reference herein in its entirety and for all purposes.

STATEMENT OF FEDERALLY SPONSORED RESEARCH OR DEVELOPMENT

This invention was made with U.S. Government support from the U.S. Army under Contracts W15P7T-06-C-F001 and W15P7T-08-C-P212. The U.S. Government has certain rights in the invention.

SUMMARY OF THE INVENTION

The various embodiments of the present invention locate slit and detector elements on the optical axis, resulting in substantially increased spectral and spatial fields of the spectrometer. These embodiments are more compact than current designs, while providing superior spatial and spectral image quality and resolution.

The various embodiments of this invention provide at least, but not limited to the following:

a spectrometer design that is compact in physical size; a spectrometer design that is low in mass
a spectrometer design that has a high spectral resolution;
a spectrometer design that has a large spatial field;
a spectrometer design that has a large spectral field;
a spectrometer design that has a high degree of spatial and spectral image quality;
a spectrometer design that has a small spectral smile distortion;
a spectrometer design that has a fast optical speed; and
a spectrometer design that has a combination of the characteristics described above with superior trade-offs than have been previously attainable.

For a better understanding of the present invention, together with other and further objects thereof, reference is made to the accompanying drawings and detailed description and the scope will be pointed out in the appended claims.

BRIEF DESCRIPTION OF THE DRAWINGS

FIG. 6A is a graphical representation of the spectral smile distortion as a function of spatial field for the embodiment of the present invention illustrated in FIG. 3;

FIG. 6B is a graphical representation of the spectral smile distortion as a function of spatial field for the embodiment of the present invention illustrated in FIG. 4;

DETAILED DESCRIPTION OF THE PREFERRED EMBODIMENTS

This invention relates generally to spectrometers, and, more particularly, but not limited to, novel spectrometer designs which are more compact in physical size and having higher spectral resolution than previous designs.

Due to their dispersive nature, the slit or slit aperture, hereinafter referred to generally as the slit, and detector elements of many spectrometer design forms are located off-axis, thereby increasing the effective optical field of the design. This often results in larger diameter spectrometers that have significantly increased size and weight, increased aberration content that degrades their spatial and spectral image quality, and increased spectral distortions that complicate spectral algorithms and data processing of the captured imagery. Spectral resolution is often compromised to balance these negative aspects of spectrometers of this type.

Figure 1:
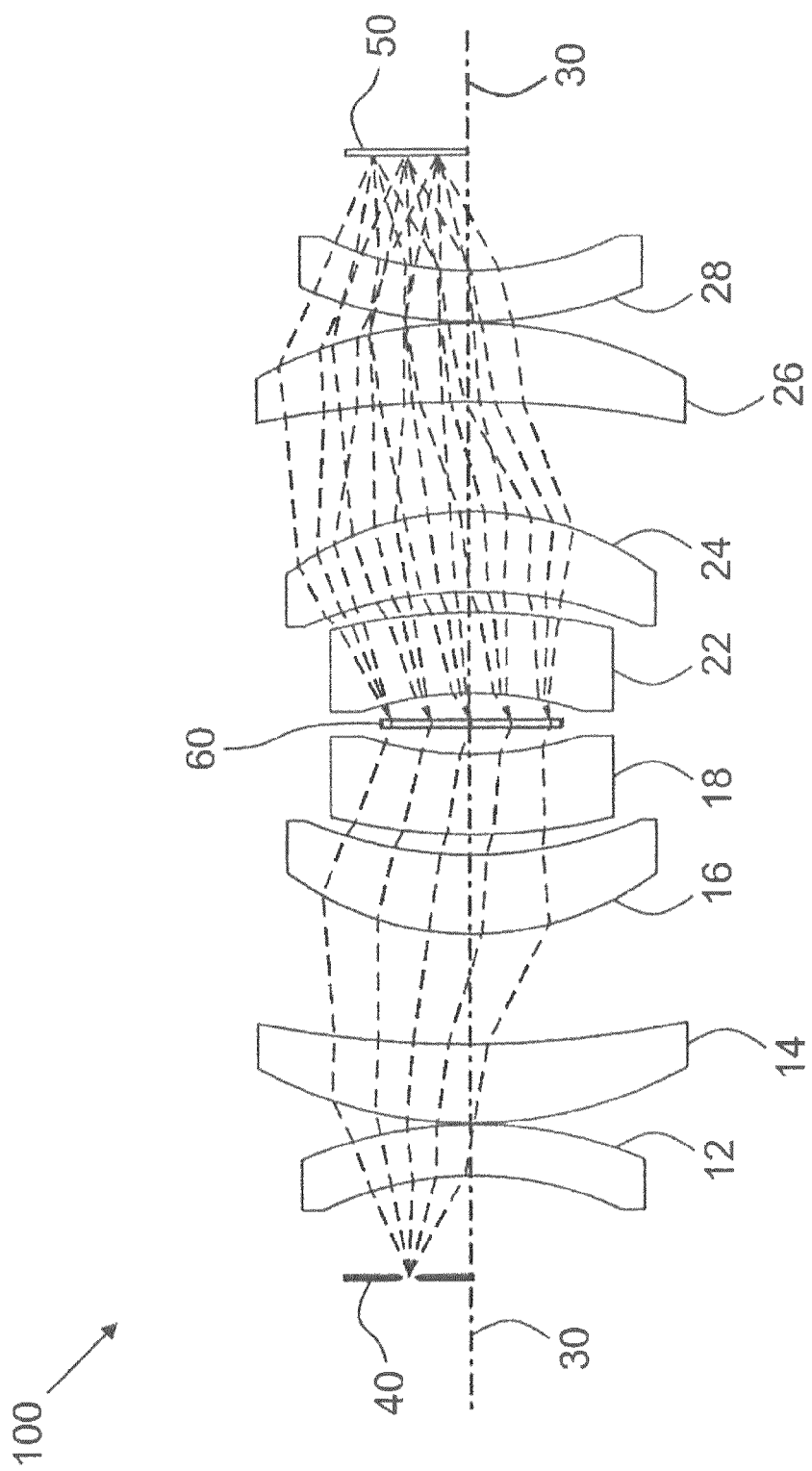
FIG. 1 is a schematic view of a compact refractive relay spectrometer, taken along its optical axis in the plane parallel to the direction of dispersion.

Reference is made to FIG. 1, which illustrates a refractive relay spectrometer 100, which includes therein a first optical subassembly and a second optical subassembly, of the type described in U.S. Pat. No. 7,061,611, which is incorporated herein by reference in its entirety and for all purposes. While the optical elements 12, 14, 16, 18, 22, 24, 26, and 28 are co-located along a single optical axis 30, the slit or slit aperture 40 and detector element 50 are displaced, in this embodiment, but not limited to, substantially an equal distance from the optical axis 30. This displacement is often necessary to compensate for the angle of diffraction at the dispersing element 60 and is typical for many spectrometer designs.

Figure 2A:
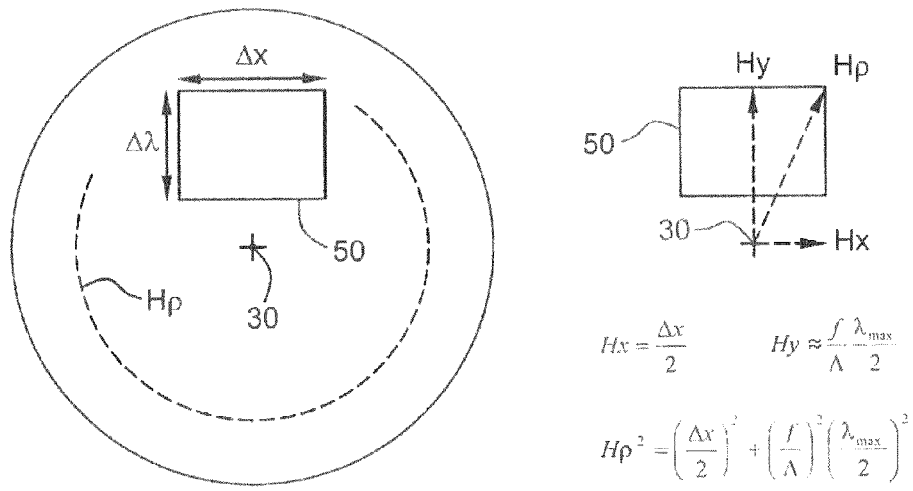
FIG. 2A is a schematic view of the spectrometer illustrated in FIG. 1, taken along a plane perpendicular to its optical axis just prior to the image plane.

This displacement of the slit 40 and detector or detector element 50 from the optical axis limits the overall compactness of the spectrometer 100 due to the size of the optical field at the image plane that results. To better understand this effect, the spatial field (Δx) and spectral field (Δλ) of the dispersed image are shown from the view of a plane perpendicular to the optical axis 30 just prior to the detector 50 in FIG. 2A, where the detector 50 is shown at its off-axis position. The optical field radius (Hρ) of the spectrometer 100 must be sufficiently large enough to accommodate the furthest extents of both the spatial field (Δx) of the slit 40 and detector 50, as well as the spectral field (Δλ) that results from the dispersion of the grating 60. The more dispersive the grating 60 becomes, the larger the size of the dispersed image at the detector 50 and the further off-axis the spectral field (Δλ) becomes, thereby increasing the optical field radius (Hρ) of the spectrometer. The relationship between the size of the spatial field (Δx), the focal length (f) of the optical subassembly of the system or spectrometer 100 optically disposed between the diffraction grating 60 and the detector 50, the period (λ) of the diffraction grating 60, and the longest wavelength ($\lambda_{max}$) in the operational spectral band of the sensor on the optical field (Hρ) is also provided in FIG. 2A for the spectrometer 100 illustrated in FIG. 1.

Figure 2B:
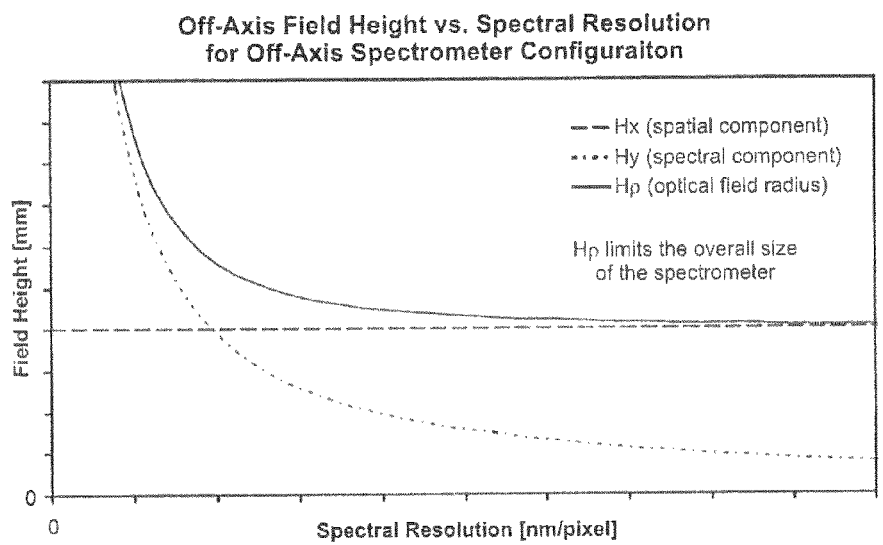
FIG. 2B is a graphical representation of the maximum optical field height as a function of spectral resolution that results from the off-axis spatial and spectral field components of the spectrometer illustrated in FIG. 1.

The spatial and spectral trade-offs for the refractive relay design form illustrated in FIG. 1 are illustrated in FIG. 2B, where it can be seen that for very coarse (large) spectral resolutions the optical field radius (Hρ) is dominated by the size of the spatial component (Hx) of the optical field, where changes to the spectral resolution have little effect on the overall size of the spectrometer. For very fine (small) spectral resolutions, however, the optical field radius (Hρ) is dominated by the spectral component (Hy) of the optical field, where changes to the spectral resolution have a great effect on the overall size of the spectrometer 100.

Since the size of the spectrometer 100 is primarily driven by the off-axis spectral field for fine spectral resolutions, the overall size of the spectrometer 100 can be minimized by substantially locating both the slit 40 or slit aperture and detector element 50 on the optical axis 30. Alternatively, for a given spectrometer size constraint, the location of the slit 40 and detector element 50 substantially to the optical axis 30 can be used to allow for a larger spatial and/or spectral field than would otherwise be possible. This increased field can be used to either increase the number of spatial pixels or increase the spectral resolution of the sensor. In addition, the reduced beam footprint on the optical elements that results from the location of the slit 40 and detector element 50 substantially to the optical axis 30 can be used to increase the optical speed, or throughput, of the sensor.

Figure 3:
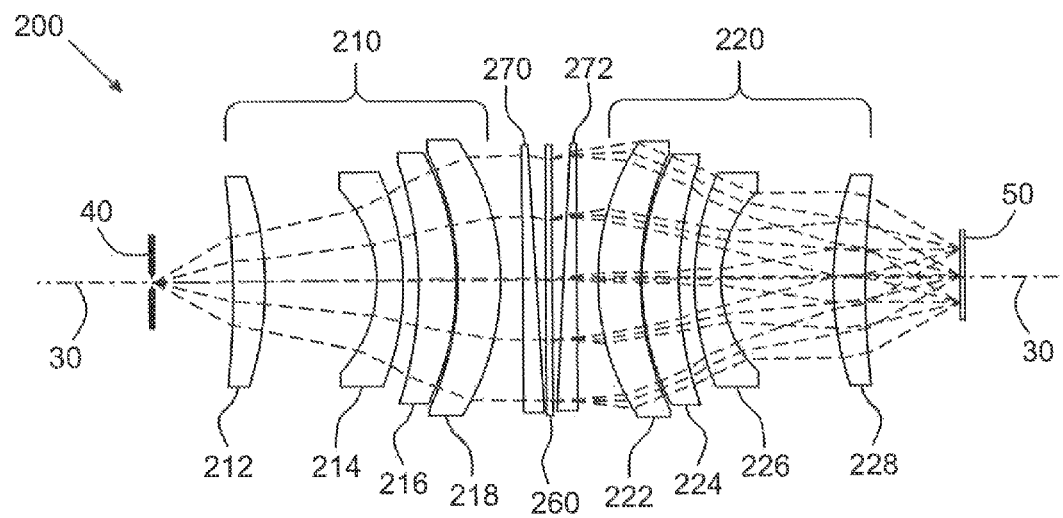
FIG. 3 is a schematic view of a compact spectrometer with high spectral resolution in accordance with an embodiment of the present invention, taken along its optical axis in the plane parallel to the direction of dispersion.

In one embodiment of the optical system or spectrometer 200, the slit or slit aperture 40, which can be used interchangeably, and the detector element 50, which can be in the form of but not limited to a focal plane array, are located substantially on the optical axis 30 by inserting a light bending element or group of elements, such as but not limited to a prism or combination of prisms, in this embodiment made up of prisms 270 and 272, between the two halves 210 and 220 of the optical system as illustrated in FIG. 3. These prisms 270 and 272 can be used to redirect all or some of the angle of incidence to the dispersive element 260 as well as to redirect all or some of the angle of diffraction from the dispersing element 260. In principle, these prisms 270 and 272 are typically located substantially near the dispersive element 260, such as but not limited to a diffraction grating, located in the substantially collimated space between the two halves 210 and 220 of the spectrometer 200.

Reference is made to FIG. 3, which is a schematic view of an embodiment of the present invention as spectrometer 200 taken along its optical axis 30 in the plane parallel to the direction of dispersion. In operation, electromagnetic radiation, typically in the ultraviolet, visible, and/or infrared bands, hereinafter referred to generally as light, emitted or reflected by a given object, either real or virtual, hereinafter referred to generally as the source, located at the object plane, in this embodiment, but not limited to, a slit or other method of extracting a line image, hereinafter referred to generally as a slit, slit aperture or element 40, is incident on a first optical subassembly 210 of an imaging optical system or spectrometer 200, in this embodiment made up of, but not limited to, refractive elements 212, 214, 216, and 218 that, in this embodiment, substantially share a common optical axis 30. The refractive elements are capable of substantially receiving a portion of the light emanating from the slit 40 and substantially collimating the light. The light is then incident on a first light bending element 270, in the form of, but not limited to a prism, but in general is any component for bending light, hereinafter referred to generally as a light bending element. The light bending element 270 is capable of substantially receiving the light from the first optical subassembly 210 of the optical system and substantially bending the light. The light is then incident on a dispersing element 260, in the form of, but not limited to a transmission diffraction grating, but in general is any component capable of angularly separating light energy according to its wavelength, hereinafter referred to generally as a dispersing element, which is capable of substantially receiving the light from the first light bending element 270 and dispersing it according to its wavelength. The dispersed light is then incident on a second light bending element 272, in the form of but not limited to a prism, which is capable of substantially receiving the light from the dispersing element 260 and substantially bending the light. The light is then incident on a second optical subassembly 220 of the imaging optical system, in this embodiment made up of, but not limited to, refractive elements 222, 224, 226, and 228 that in this embodiment substantially share the common optical axis 30. The refractive elements are capable of substantially receiving the light from the second light bending element 272 and substantially focusing the light to a focus position (hereinafter also referred to as an image plane) of a CCD array, phosphorescent screen, photographic film, microbolometer array, or other means of detecting light energy, hereinafter referred to generally as a detecting element 50.

Figure 4:
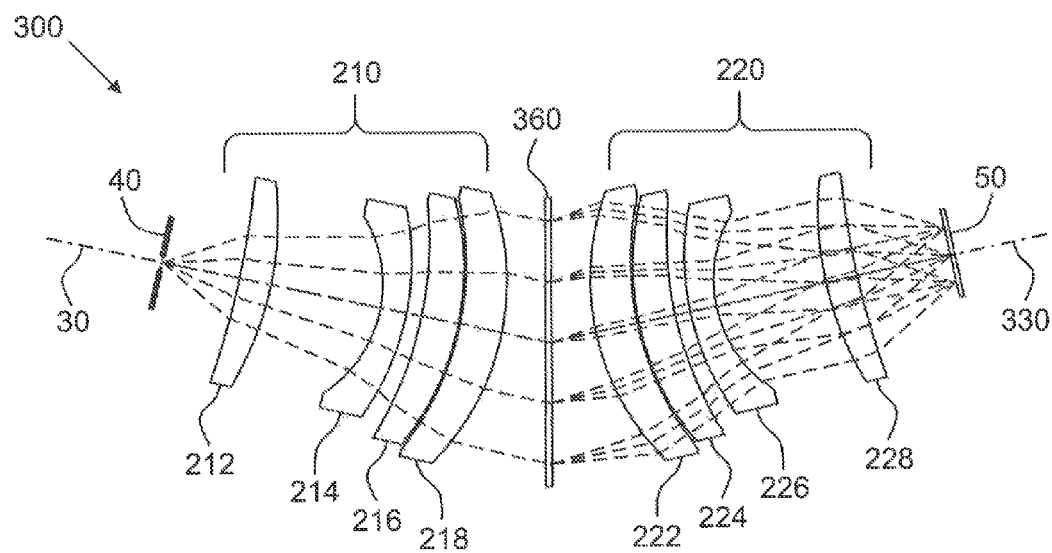
FIG. 4 is a schematic view of a compact spectrometer with high spectral resolution in accordance with another embodiment of the present invention, taken along its optical axis in the plane parallel to the direction of dispersion.

In a further embodiment or spectrometer 300 of the present invention, the slit 40 and detector element 50 are substantially located on the optical axes 30 and 330, respectively, by inserting a bend in the optical axis 30 at or proximate to the dispersing element 360, as illustrated in FIG. 4, such that the two halves 210 and 220 of the spectrometer 300 are each substantially centered along their own optical axes 30 and 330 respectively.

Reference is made to FIG. 4, which is a schematic view of an embodiment of the spectrometer 300 of the present invention taken along its optical axis in the plane parallel to the direction of dispersion. In operation, light emanating from a slit element 40 is incident on a first optical subassembly 210 of an imaging optical system, in this embodiment made up of, but not limited to, refractive elements 212, 214, 216, and 218 that, in this embodiment, substantially share a common optical axis 30. The refractive elements are capable of substantially receiving a portion of the light emanating from the slit 40 and substantially collimating the light. The light is then incident on a dispersing element 360, in this embodiment a transmission diffraction grating, which is capable of substantially receiving the light from the first optical subassembly 210 of the spectrometer 300 and dispersing it according to its wavelength. The dispersed light is then incident on a second optical subassembly 220 of the spectrometer 300, in this embodiment made up of, but not limited to, refractive elements 222, 224, 226, and 228 that in this embodiment substantially share a common optical axis 330. The refractive elements are capable of substantially receiving the light from the dispersing element 360 and substantially focusing the light to a detecting element 50. The optical axis 330 is substantially bent relative to the optical axis 30 at a point substantially proximate to the dispersing element 360 such that the light dispersed by the dispersing element 360 is substantially centered along the second optical subassembly 220 of the spectrometer 300.

Figure 5A:
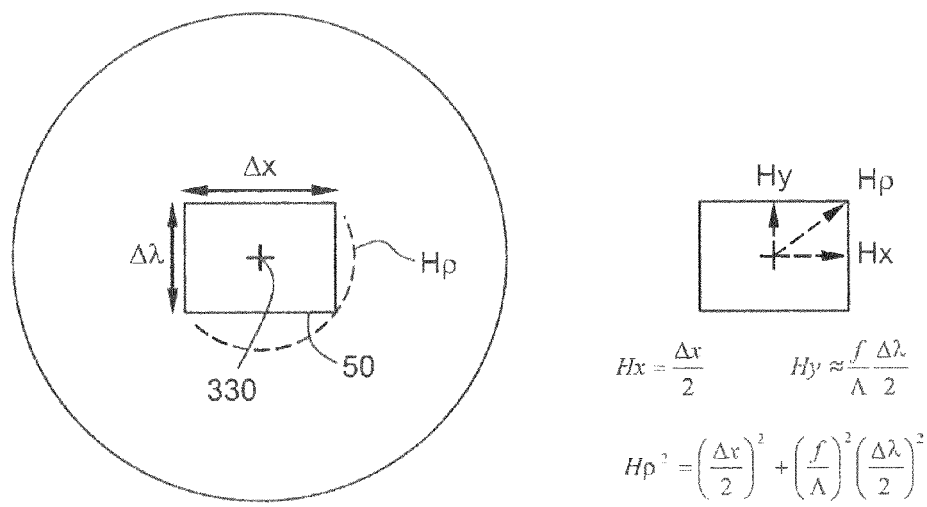
FIG. 5A is a schematic view of the embodiments of the present invention illustrated in FIG. 3 and FIG. 4, taken along a plane perpendicular to their respective optical axes just prior to the image plane.

FIG. 5A illustrates the impact of the location of the slit 40 and detector element 50 substantially to the optical axes 30 and 330 respectively in the embodiment 300 illustrated in FIG. 4 on the overall size of the optical field radius (Hρ), where the spectral component (Hy) of the optical field is greatly reduced due to the substantially axial location of the detector 50 along the optical axis 330. To better understand this effect, the spatial field (Δx) and spectral field (Δλ) of the dispersed image are shown from the view of a plane perpendicular to the optical axis 330 just prior to the detector 50 in FIG. 5A, where the detector 50 is shown at its substantially axial position. The optical field radius (Hρ) of the spectrometer 300 must be sufficiently large enough to accommodate the furthest extents of both the spatial field (Δx) of the slit 40 and detector 50, as well as the spectral field (Δλ) that results from the dispersion of the grating 360. The relationship between the size of the spatial field (Δx), the focal length (f) of the optical subassembly of the system or spectrometer 300 optically disposed between the diffraction grating 60 and the detector 50, the period (λ) of the diffraction grating 60, and spectral bandwidth (Δλ) of the operational spectral band of the sensor on the optical field (Hρ) is also provided in FIG. 5A for the spectrometer 300 illustrated in FIG. 4.

Figure 5B:
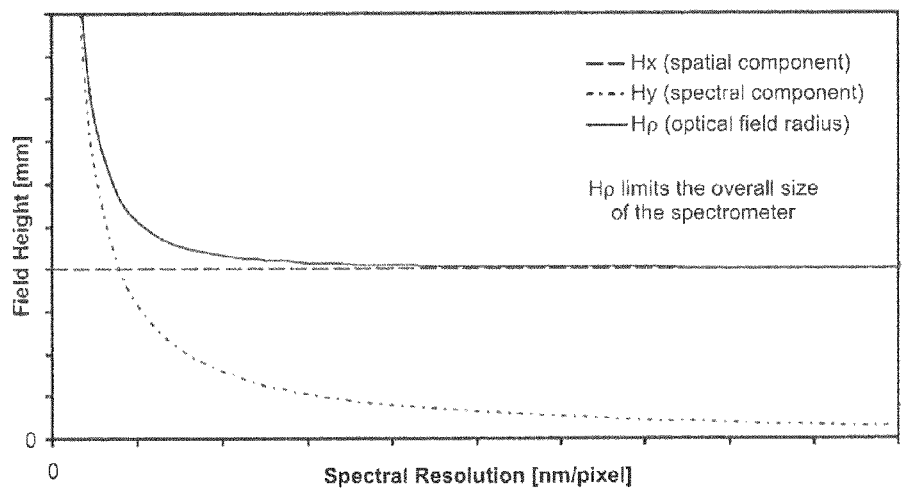
FIG. 5B is a graphical representation of the maximum optical field height as a function of spectral resolution that results from the on-axis spatial and spectral field components of the embodiments of the present invention illustrated in FIG. 3 and FIG. 4.

As can be seen in FIG. 5B, the optical field radius (Hρ) of the spectrometer 300 remains dominated by the size of the spatial component (Hx) of the optical field for coarse spectral resolutions, but does not become dominated by the spectral component (Hy) of the optical field until much finer spectral resolutions than for the spectrometer 100 illustrated in FIG. 2B.

Spectral smile is a wavelength-dependent distortion known in the art that represents a measure of departure from linearity in the monochromatic image of the slit aperture 40 at the image plane in an imaging spectrometer. It is typically desirable to limit this distortion to less than a few hundredths of a percent of the spatial field width. The spectral smile distortions of the embodiments of the spectrometers 200 and 300 illustrated in FIG. 3 and FIG. 4, respectively, are shown side by side in FIG. 6A and FIG. 6B, respectively, where it can be seen that a significant amount of spectral smile distortion 280 and 380 is introduced in both embodiments 200 and 300 respectively. However, since the spectral smile distortion 280 and 380 introduced by the embodiments 200 and 300 respectively are opposite in sign, a further embodiment of the present invention that combines both of these approaches can be used to provide an axial configuration with substantially lower spectral smile distortion than either of the embodiments 200 or 300 alone.

Figure 7:
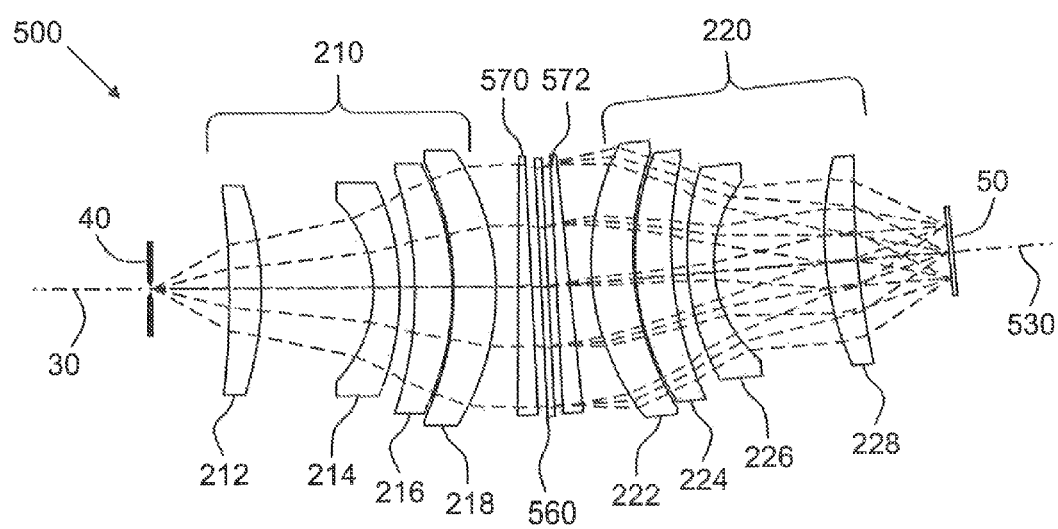
FIG. 7 is a schematic view of a compact spectrometer with high spectral resolution in accordance with a further embodiment of the present invention, taken along its optical axis in the plane parallel to the direction of dispersion.
Figure 8:
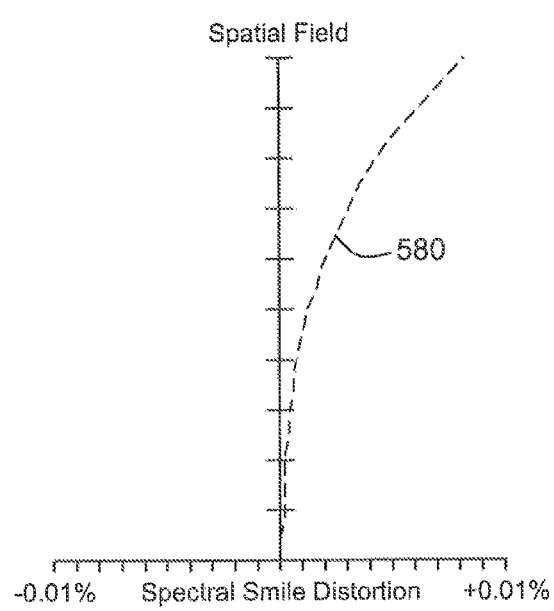
FIG. 8 is a graphical representation of the spectral smile distortion as a function of spatial field for the embodiment of the present invention illustrated in FIG. 7.

In a further embodiment of the spectrometer 500, a hybrid axial refractive relay design form with both the introduction of prism elements and a bent optical axis is illustrated in FIG. 7. The slit 40 and detector element 50 are substantially located on the optical axes 30 and 530 respectively by inserting a light bending element 570 or group of elements, such as but not limited to a prism or combination of prisms, between the two halves 210 and 220 of the spectrometer 500 and inserting a bend in the optical axis 30 at or proximate to the dispersing element 560. The spectral distortion 580 for this embodiment 500 is provided in FIG. 8 and illustrates the significantly reduced spectral smile distortion 580, in this embodiment by approximately two orders of magnitude, over the embodiments 200 and 300 illustrated in FIG. 6a and FIG. 6b respectively.

Reference is made to FIG. 7, which is a schematic view of spectrometer 500 taken along its optical axis in the plane parallel to the direction of dispersion. In operation, light emanating from a slit element 40, is incident on a first optical subassembly 210 of spectrometer 500, in this embodiment made up of, but not limited to, refractive elements 212, 214, 216, and 218 that, in this embodiment, substantially share a common optical axis 30, which is capable of substantially receiving a portion of the light emanating from the slit 40 and substantially collimating the light. The light is then incident on a first light bending element 570, which is capable of substantially receiving the light from the first optical subassembly 210 of the spectrometer 500 and substantially bending the light. The light is then incident on a dispersing element 560, in this embodiment a transmission diffraction grating, which is capable of substantially receiving the light from the first light bending element 570 and dispersing it according to its wavelength. The dispersed light is then incident on a second light bending element 572, in this embodiment a prism, which is capable of substantially receiving the light from the dispersing element 560 and substantially bending the light. The light is then incident on a second optical subassembly 220 of the imaging optical system, in this embodiment made up of, but not limited to, refractive elements 222, 224, 226, and 228 that in this embodiment substantially share a common optical axis 530, which is capable of substantially receiving the light from the second light bending element 572 and substantially focusing the light to a detecting element 50. The optical axis 530 is substantially bent relative to the optical axis 30 at a point substantially proximate to the dispersing element such that the light dispersed by the dispersing element 560 is substantially centered along the second optical subassembly 220 of the spectrometer 500.

Figure 9:
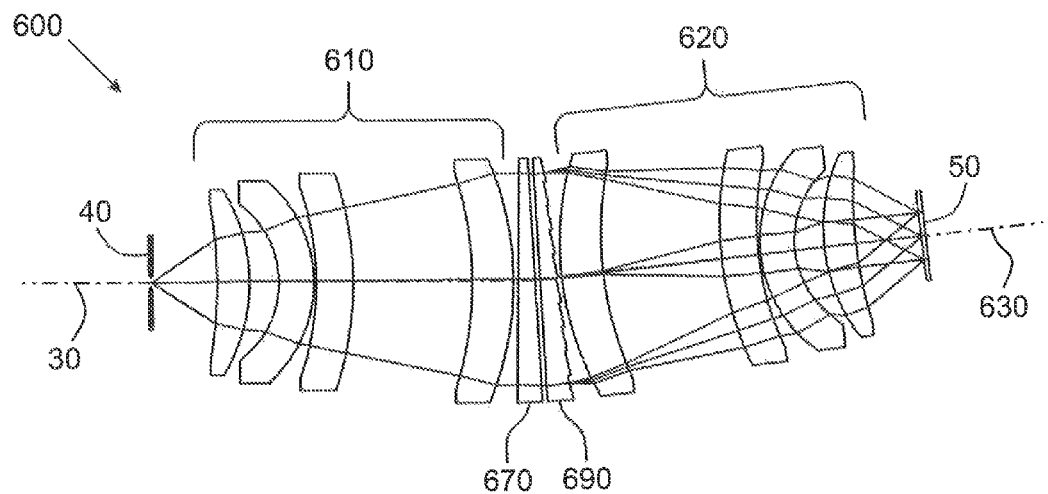
FIG. 9 is a schematic view of a compact spectrometer with high spectral resolution in accordance with a further embodiment of the present invention, taken along its optical axis in the plane parallel to the direction of dispersion.

In a further embodiment or spectrometer 600, a hybrid axial refractive relay design form with both the introduction of prism elements and a bent optical axis is illustrated in FIG. 9, where the dispersing element 560 is combined with one of the prisms 572 in the embodiment 500 illustrated in FIG. 7 to form what is commonly referred to as a "grism" or grism element 690, where a grating is fabricated into one or more surfaces of the prism 572. The slit 40 and detector element 50 are substantially located on the optical axes 30 and 630 respectively by inserting a prism 670 and a grism element 690 between the two halves 610 and 620 of the spectrometer 600 and by inserting a bend in the optical axis 30 at or proximate to the dispersing element 690.

Figure 10:
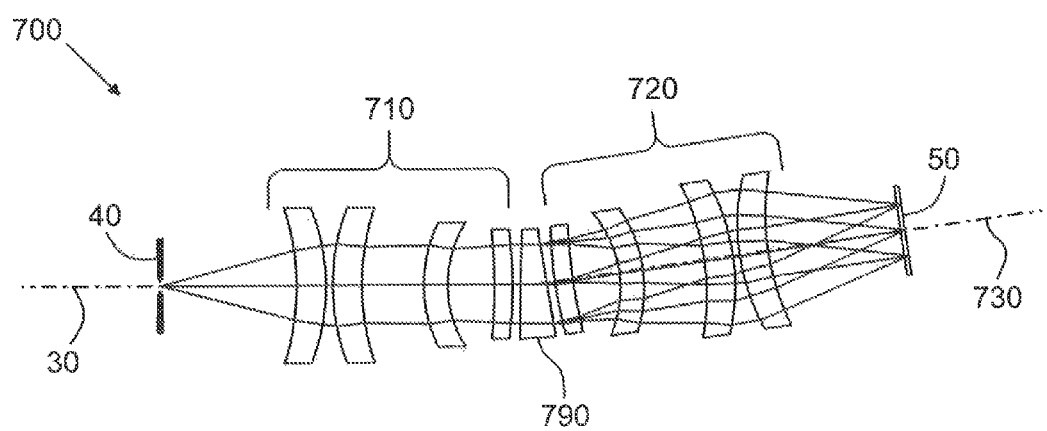
FIG. 10 is a schematic view of a compact spectrometer with high spectral resolution in accordance with a still further embodiment of the present invention, taken along its optical axis in the plane parallel to the direction of dispersion.

In a still further embodiment of spectrometer 700, a hybrid axial refractive relay design form with both the introduction of a grism element 790 and a bent optical axis 730 is illustrated in FIG. 10, where the dispersing element is a grism element 790. The slit 40 and detector element 50 are substantially located on the optical axes 30 and 730 respectively by inserting a grism element 790 between the two halves 710 and 720 of the spectrometer 700 and by inserting a bend in the optical axis 30 at or proximate to the dispersing element 790. In principle, the dispersive element and prisms can be combined into any combination of dispersing elements, prisms, or grisms in accordance with the present invention.

Although the invention has been described with respect to various embodiments, it should be realized this invention is also capable of a wide variety of further and other embodiments within the spirit and scope of the invention.

The invention claimed is:

1. A spectrometer comprising:
   at least one slit element located at an object plane;
   a first optical subassembly having at least one refractive optical element;
   said at least one slit element being centered substantially on an optical axis of said first optical subassembly;
   said first optical subassembly configured to substantially collimate, at a plane, light emanating from said at least one slit element; said plane being located between said first optical subassembly and a second optical subassembly; said plane referred to as a center plane;
   at least one dispersive element located at substantially the center plane;
   at least one light bending element located substantially proximate to the center plane; said at least one light bending element configured to bend collimated light incident on said at least one light bending element;
   said second optical subassembly having at least one refractive optical element;
   said second optical subassembly configured to image the substantially collimated light from the center plane onto an image plane;
   an optical axis of said second optical subassembly being at a substantially non-parallel angle to the optical axis of said first optical subassembly;
   said angle and bending from said at least one light bending element balanced to substantially reduce spectral smile distortion of the spectrometer; and
   at least one detecting element located substantially at the image plane;
   said at least one detecting element being centered substantially on the optical axis of said second optical subassembly.

2. The spectrometer of claim 1 wherein said at least one light bending element is optically disposed between said first optical subassembly and said dispersive element.

3. The spectrometer of claim 1 wherein said at least one light bending element is optically disposed between said dispersive element and said second optical subassembly.

4. The spectrometer of claim 1 wherein said at least one light bending element comprises a prism element.

5. The spectrometer of claim 1 wherein said at least one dispersive element and at least one light bending element comprises an at least one grism element.

6. A spectrometer comprising:
   at least one slit element located at an object plane;
   a first optical subassembly having at least one refractive optical element;
   said at least one slit element being centered substantially on the optical axis of said first optical subassembly;
   said first optical subassembly configured to substantially collimate, at a plane, light emanating from said at least one slit element; said plane being located between said first optical subassembly and a second optical subassembly; said plane referred to as a center plane;
   an optical axis of said second optical subassembly being at a substantially non-parallel angle to the optical axis of said first optical subassembly;
   at least one dispersive element located at substantially the center plane;
   a first light bending element located proximate to the center plane and optically disposed between said first optical subassembly and said dispersive element; said first light bending element configured to bend collimated light incident on said first light bending element;
   a second light bending element located proximate to the center plane and optically disposed between said second optical subassembly and said dispersive element; said second light bending element configured to bend collimated light incident on said second light bending element;
   said second optical subassembly having at least one refractive optical element;
   said second optical subassembly configured to image the substantially collimated light from the center plane onto an image plane;
   said angle and bending from said at least one light bending element balanced to substantially reduce spectral smile distortion of the spectrometer; and
   at least one detecting element located substantially at the image plane;
   said at least one detecting element being centered substantially on the optical axis of said second optical subassembly;
   said optical axis of said first optical subassembly and said optical axis of said second optical subassembly being substantially non-parallel;
   said optical axis of said second optical subassembly intersecting substantially at the center plane.

7. The spectrometer of claim 6 wherein said first light bending element comprises a prism element.

8. The spectrometer of claim 6 wherein said second light bending element comprises a prism element.

9. The spectrometer of claim 6 wherein said at least one dispersive element and at least one light bending element comprises a grism element.

10. A spectrometer comprising:
    at least one slit element located at an object plane;
    a first optical subassembly having at least one refractive optical element;
    said at least one slit element being centered substantially on an optical axis of said first optical subassembly;
    said first optical subassembly configured to substantially collimate, at a plane, light emanating from said at least one slit element; said plane being located between said first optical subassembly and a second optical subassembly; said plane referred to as a center plane;
    at least one dispersive element located at substantially the center plane;
    at least one light bending element located substantially proximate to the center plane; said at least one light bending element configured to bend collimated light incident on said at least one light bending element;
    said second optical subassembly having at least one refractive optical element;
    said second optical subassembly configured to image the substantially collimated light from the center plane onto an image plane;
    the optical axis of said second optical subassembly being at a substantially non-parallel angle to the optical axis of said first optical subassembly;

said angle and bending from said at least one light bending element balanced to reduce spectral smile distortion of the spectrometer to less than 1% of a spatial field width; and at least one detecting element located substantially at the image plane;

said at least one detecting element being centered substantially on the optical axis of said second optical subassembly.

11. The spectrometer of claim 10 wherein said at least one light bending element is optically disposed between said first optical subassembly and said dispersive element.

12. The spectrometer of claim 10 wherein said at least one light bending element is optically disposed between said dispersive element and said second optical subassembly.

13. The spectrometer of claim 10 wherein said at least one light bending element comprises a prism element.

14. The spectrometer of claim 10 wherein said at least one dispersive element and at least one light bending element comprises an at least one grism element.

* * * * *